United States Patent [19]

Hardwick

[11] Patent Number: 5,252,259
[45] Date of Patent: Oct. 12, 1993

[54] PURIFICATION OF SULFUR HEXAFLUORIDE

[75] Inventor: Steven J. Hardwick, Wilmington, Del.

[73] Assignee: Hercules Incorporated, Wilmington, Del.

[21] Appl. No.: 688,772

[22] Filed: Apr. 22, 1991

[51] Int. Cl.$^5$ .................. C09K 15/00; C08F 14/00; C02F 1/70
[52] U.S. Cl. ................ 252/188.28; 423/240.5; 423/242.2; 423/219; 521/53; 521/146
[58] Field of Search ............... 252/188.28; 423/240.5, 423/242.2, 219; 521/53, 146

[56] References Cited

U.S. PATENT DOCUMENTS

| | | | |
|---|---|---|---|
| 3,675,392 | 7/1971 | Reighter | 55/25 |
| 4,380,532 | 4/1983 | Mazurin et al. | 423/469 |
| 4,603,148 | 7/1986 | Tom | 521/31 |
| 4,604,270 | 8/1986 | Tom | 423/262 |
| 4,659,552 | 4/1987 | Tom | 423/219 |
| 4,696,953 | 9/1987 | Tom | 521/146 |
| 4,716,181 | 12/1987 | Tom | 521/53 |
| 4,761,395 | 8/1988 | Tom et al. | 502/401 |
| 4,797,227 | 1/1989 | Tom et al. | 252/194 |

FOREIGN PATENT DOCUMENTS

| | | |
|---|---|---|
| 134947 | 3/1985 | European Pat. Off. . |
| 283961 | 9/1988 | European Pat. Off. . |
| 50-008040 | 4/1975 | Japan . |
| 60-054723 | 3/1985 | Japan . |
| 1107363 | 3/1968 | United Kingdom . |

*Primary Examiner*—Richard D. Lovering
*Assistant Examiner*—Joseph D. Anthony
*Attorney, Agent, or Firm*—Joanne W. Patterson

[57] ABSTRACT

Impurities such as oxygen and moisture can be removed from sulfur hexafluoride by contacting the impure gas with the reaction product of sulfur hexafluoride and a lithium-substituted macroreticulate polymer.

3 Claims, No Drawings

PURIFICATION OF SULFUR HEXAFLUORIDE

FIELD OF THE INVENTION

This invention relates to the removal of impurities such as oxygen and moisture from sulfur hexafluoride.

BACKGROUND OF THE INVENTION

Sulfur hexafluoride is a nonflammable gas of low toxicity that is considered to be inert in most applications. It is used for plasma etching in semiconductor processing and as a gaseous insulator in high voltage electrical devices such as cables, capacitors and transformers. Traces of oxygen and moisture are undesirable in these applications.

Prior methods for purification of sulfur hexafluoride include cryogenic separations, as described, for example, in United Kingdom Patent 1,107,363. The process is energy intensive and, unlike the process of the present invention, is not well suited to point-of-use applications. The separation is based on differences in boiling points and is not capable of removing trace impurities to the part per million level.

Molecular sieves can be used to adsorb impurities such as water and carbon dioxide from sulfur hexafluoride as disclosed in U.S. Pat. No. 3,675,392. In the present invention impurities are irreversibly bound by chemical reaction. Molecular sieves require activation at high temperatures and, unlike the reaction products of the present invention, give no visual indication of when they are saturated. Activated carbon is useful for adsorbing impurities, such as carbon fluorides, formed in the manufacture of sulfur hexafluoride (see Japanese examined patent application JP 75-008040). It is not capable of removing oxygen and moisture.

Calcium hydride has been reported to react with water and carbon dioxide impurities in sulfur hexafluoride (see Japanese unexamined patent application JP 60-054723). Calcium hydride has a lower capacity for impurity removal than the product used in the present invention and is not reactive toward oxygen.

SUMMARY OF THE INVENTION

A method for removing trace impurities from sulfur hexafluoride has now been found that can be employed at the point-of-use of the gas and results in a color change when the activity of the purifier has been depleted. The process of this invention for removing impurities from sulfur hexafluoride comprises (1) contacting the sulfur hexafluoride with the reaction product of sulfur hexafluoride and a metallated macroreticulate polymer having a plurality of pendant functional groups or mixtures of functional groups having the general formula:

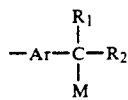

where Ar is an aromatic hydrocarbon radical containing from one to three rings, $R_1$ and $R_2$ are the same or different and are selected from the group consisting of hydrogen and alkyl hydrocarbon radicals containing from 1 to 12 carbon atoms and M is lithium, said metallated macroreticulate polymer having within its pores a compound selected from the group consisting of a 1-12 carbon alkyl compound of lithium and a hydride of lithium, or mixtures thereof, and (2) separating the purified sulfur hexafluoride from the polymeric reaction product.

DETAILED DESCRIPTION OF THE INVENTION

The macroreticulate polymer that is used as the starting material for the metallated polymer is described in U.S. Pat. No. 4,603,148, which is incorporated herein by reference.

The metallation can be achieved by contacting the macroreticulate polymer starting material with a stoichiometric excess of a solution containing an alkyl compound of lithium, where the alkyl group is a 1-12 carbon alkyl group. Normal-butyllithium is preferred. Typical solvents for the lithium alkyl compound include aliphatic hydrocarbons, aromatic hydrocarbons and ethers. The metallation is carried out at ambient temperature and pressure. The contact time is typically in the range of from about 10 minutes to about 10 hours. Because an excess of the metallating agent is used, unreacted metallating agent remains within the pores of the macroreticulate polymer. The unreacted reagent is believed to be strongly bound in clusters to the lithium immobilized in the functional groups on the polymer.

The formula for the metallated macroreticulate polymer is given in the Summary of the Invention. Ar is any aromatic hydrocarbon radical containing from one to three rings, such as phenylene, naphthylene, anthracene, fluorenylene and the like. Phenylene is preferred. $R_1$ and $R_2$ are the same or different and can be hydrogen or an alkyl hydrocarbon radical having from 1 to 12 carbon atoms. Typical alkyl hydrocarbon radicals include methyl, ethyl, and the various isomers of propyl, butyl, pentyl, hexyl, octyl, decyl and dodecyl. M is lithium.

For some applications it may be desirable to subject the metallated macroreticulate polymer to a thermal aging process. The thermal aging process involves heating the polymer at a high temperature, preferably from about 140° C. to about 250° C. for several hours, preferably more than six hours. Depending upon the time and temperature used, some or all of the unreacted metal alkyl compound in the pores of the polymer is thus decomposed to form the corresponding metal hydride. The thermal aging is carried out in such a manner that the gaseous reaction products can be removed either under vacuum or under an inert gas purge to prevent undesirable side reactions.

The reaction of the metallated macroreticulate polymer with sulfur hexafluoride is exothermic and the reaction must be carefully controlled to moderate the exotherm. The sulfur hexafluoride can be used alone or diluted with an inert gas such as nitrogen, helium, argon, krypton or xenon. The concentration of sulfur hexafluoride is in the range of 0.1 to 100% by volume. The preferred range is 1-10 vol. % in an inert diluent gas and the most preferred range is 1-5 vol. %. If too low a concentration is used, very long reaction times are required, making the process less cost effective. The use of a diluent gas provides an additional heat transfer mechanism to carry away the heat of reaction from the product. Failure to fully "neutralize" the reactive sites on the metallated polymer prior to exposure to the concentrated sulfur hexafluoride that is to be purified can result in exotherms in excess of 400° C. and pyrolysis of the resin. Although the exact mechanism of the reaction is not known, $SF_6$ is believed to react with both the metallated functional groups on the polymer and with the lithium alkyl or lithium hydride within the pores of the polymer.

The mass flow rate of sulfur hexafluoride should preferably be less than 30 standard cubic centimeters per minute (sccm) in order to minimize the exotherm to less than 200° C. Exotherms in excess of this temperature can result in the generation of hydrocarbon emissions, which are undesirable in high purity gas distribution systems. In the most preferred embodiment, the flow rate of sulfur hexafluoride should preferably be about 1 sccm. At this flow rate the exotherm should be less than 60° C., minimizing any danger of hydrocarbon emissions.

The time required for the reaction depends on the sulfur hexafluoride flow rate and the volume of the metallated polymer bed. In practice the exposure of the metallated polymer to the sulfur hexafluoride should preferably be continued until the bed temperature at the outlet of the reactor has cooled to ambient temperature. The metallated polymer retains its characteristic blue-black color after reaction with $SF_6$. This color is bleached following exposure to impurities.

Following the reaction of the metallated polymer with sulfur hexafluoride, the polymeric reaction product can be exposed to the sulfur hexafluoride that is to be purified. In the most preferred embodiment, the impure sulfur hexafluoride is slowly blended in with an inert diluent gas. The relative proportion of the sulfur hexafluoride is gradually increased until the concentration of the gas is 100 vol. % $SF_6$. A gradual increase in the concentration of $SF_6$ ensures that all of the active sites will react.

The polymeric reaction product of the present invention can be used to remove oxygen, moisture, carbon dioxide and sulfur hexafluoride decomposition products such as sulfur tetrafluoride, sulfur dioxide, hydrogen sulfide, fluorine and hydrogen fluoride from sulfur hexafluoride or mixtures of sulfur hexafluoride with compatible gases, i.e., those that do not react with $SF_6$. Examples of compatible gases include helium, argon, krypton, xenon, nitrogen, hydrogen, methane, and carbon tetrafluoride. The level of these impurities in the sulfur hexafluoride is reduced to less than one part per million.

The metallated polymer can be reacted with $SF_6$ following manufacture of the polymer, then transferred to smaller containers under an inert atmosphere for point-of-use applications. Alternatively, the metallated polymer can be reacted with $SF_6$ in the container in which the polymeric reaction product is intended to be used. The polymeric reaction product can be used in any type of purification apparatus known in the art. The apparatus is preferably cleaned and flushed with an inert gas prior to addition of the metallated polymer. An apparatus employing end point detection to determine when the reactive sites on the polymer are depleted is particularly preferred. An example of a suitable apparatus incorporating end point detection is described in U.S. Pat. No. 4,782,226.

The polymeric reaction product can be used at the point-of-use of the sulfur hexafluoride or during manufacture of the gas. Purification can be accomplished in either a static mode, e.g., when using the resin as a getter in a power transformer, or under a dynamic flow of gas. Dynamic gas flow is preferred.

EXAMPLE 1

A lithiated macroreticulate polymer is prepared as follows. Amberlite XAD-4, a macroreticulate styrene-divinylbenzene copolymer manufactured by Rohm and Haas, is wetted with methanol, then washed with copious amounts of deionized water. The resin is oven dried at 120° C. under vacuum to constant weight. The polymer is placed in a reaction vessel and dried for about six hours under a stream of nitrogen at 150° C. The reaction vessel is then flooded with 25 wt. % n-butyllithium in hexane and the solvent is removed under a nitrogen stream at 120° C. The polymer is washed quickly with 4 bed volumes of hexane to remove surface n-butyllithium and dried at 190° C. (wall temperature of reactor) for 30 hours. One bed volume is equal to the volume of the unfilled bed.

The polymeric reaction product to be used for purifying sulfur hexafluoride is prepared by charging a 150 ml sample of the lithiated polymer into a cylindrical test cell fitted with thermocouples in the top, middle, and bottom of the bed. The apparatus is pressure tested and pressure vented with 30 psig of purified nitrogen (15–20 cycles). A flow of 20 ml/min of 1% $SF_6$ in $N_2$ is established and the lithiated polymer is by-passed. The by-pass is then closed and the flow diverted through the lithiated polymer and the flow is rechecked. The table below gives the maximum exotherm temperature and the time at which each thermocouple reaches its maximum temperature.

|  | Temp. | Time |
| --- | --- | --- |
| Top | 79° C. | 15 min |
| Middle | 82° C. | 54 min |
| Bottom | 60° C. | 109 min |

The reaction is complete when all temperatures are within 1° C., which occurs after approximately four hours. The 1% $SF_6$ mixture is gradually replaced with neat $SF_6$ until the entire flow consists of 59 ml/min of $SF_6$. The polymeric reaction product is black in color.

When $SF_6$ having an initial oxygen concentration of 9,000 ppm $O_2$ is passed through the polymeric reaction product prepared as described above, the oxygen concentration is reduced to below 1 ppm. When $SF_6$ having an initial moisture concentration of approximately 4,400 ppm $H_2O$ is passed through the polymeric reaction product, the moisture content is also reduced to below 1 ppm. Exposure of the polymeric reaction product to moisture and oxygen results in bleaching of the color.

Oxygen capacity is determined as follows. A 20 ml sample of the polymeric reaction product prepared as described above is placed in a glass tube and the reaction product is exposed to a test gas containing 9,000 ppm $O_2$ in $N_2$ at 10 liter/hr. Oxygen is monitored with a Delta F trace oxygen analyzer. The capacity measurement is terminated when the $O_2$ concentration in the effluent from the tube reaches 1 ppm. The oxygen capacity is 5.2 liters/liter of bed.

Moisture capacity is determined as follows. A 70 ml sample of the polymeric reaction product is placed in a glass tube and the reaction product is exposed to a test gas containing 4400 ppm water at 6 liters/hr. The test gas is generated by bubbling the nitrogen carrier gas through a packed tower containing a 12 wt. % solution of $CaCl_2$ in water maintained at −4° C. Moisture is monitored using a Meeco Bravo NEP-1 moisture analyzer. The capacity measurement is terminated when the H₂O concentration in the effluent reaches 1 ppm. The moisture capacity is 14.6 liters/liter of bed.

EXAMPLE 2

A 150 ml sample of the lithiated polymer prepared as described in Example 1 is treated with $SF_6$ as described in Example 1, except that a 3% mixture of $SF_6$ in $N_2$ at a flow rate of 50 ml/min is used. The treatment is conducted for 7 ½ hours prior to introducing pure sulfur hexafluoride. The maximum reaction temperature is less than 75° C. The oxygen capacity of the polymeric reaction product is 4.9 liters/liter of bed and the moisture capacity is 11.8 liters/liter of bed.

What I claim is:

1. A macroreticulate polymer scavenger comprising the reaction product of (1) sulfur hexafluoride and (2) a metallated macroreticulate polymer having a plurality of pendant functional groups or mixtures of functional groups having the general formula:

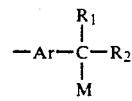

where Ar is an aromatic hydrocarbon radical containing from one to three rings, $R_1$ and $R_2$ are the same or different and are selected from the group consisting of hydrogen and alkyl hydrocarbon radicals containing from 1 to 12 carbon atoms, and M is lithium, said metallated macroreticulate polymer having within its pores a compound selected from the group consisting of a 1–12 carbon alkyl compound of lithium, a hydride of lithium, and mixtures thereof.

2. The macroreticulate polymer scavenger of claim 1 wherein $R_1$ is H and $R_2$ is pentyl.

3. The macroreticulate polymer scavenger of claim 1 wherein the metallated macroreticulate polymer is a metallated macroreticulate styrene-divinylbenzene copolymer.

* * * * *